United States Patent [19]
Dandridge et al.

[11] Patent Number: 5,668,779
[45] Date of Patent: Sep. 16, 1997

[54] HYDROPHONE GROUP DESIGN FOR SHALLOW TOWED APPLICATIONS

[75] Inventors: Anthony Dandridge, Burke, Va.; Alan B. Tveten, Fort Washington, Md.; Aileen M. Yurek, Moosup, Conn.

[73] Assignee: The United States of America as represented by the Secretary of the Navy, Washington, D.C.

[21] Appl. No.: 625,081

[22] Filed: Mar. 29, 1996

[51] Int. Cl.$^6$ .................................................. H04R 1/44
[52] U.S. Cl. .................................................. 367/149
[58] Field of Search .................................. 367/149, 141, 367/140; 356/345; 250/227.19, 227.18, 227.27, 227.16

[56] References Cited

U.S. PATENT DOCUMENTS

| | | | |
|---|---|---|---|
| 4,115,753 | 9/1978 | Shajenko | 367/149 |
| 4,525,818 | 7/1985 | Cielo et al. | 367/149 |
| 4,749,254 | 6/1988 | Seaver | 367/141 |
| 5,285,424 | 2/1994 | Meyer | 367/149 |
| 5,317,544 | 5/1994 | Maas et al. | 367/149 |
| 5,363,342 | 11/1994 | Layton et al. | 367/149 |
| 5,394,378 | 2/1995 | Dandridge et al. | 367/149 |

*Primary Examiner*—Daniel T. Pihulic
*Attorney, Agent, or Firm*—Thomas E. McDonnell; George Jameson

[57] ABSTRACT

A hydrophone group for shallow towed applications in less than 50 feet of water. The hydrophone group has a series of hydrophones connected by relatively insensitive fiber optic interconnects. The individual hydrophones are sufficiently sensitive such that the interconnecting optical fiber does not introduce excessive noise. Each hydrophone is basically a sensing fiber wrapped around an air-backed mandrel. Each air-backed mandrel is formed of an extended solid frame substantially non-compliant along a longitudinal axis. The extended solid frame is provided with a channel around the periphery thereof. The channel extends substantially the entire length of the extended solid frame. A flexible outer covering surrounds the extended solid frame. The flexible outer covering is highly compliant in a radial direction extending from the longitudinal axis. The air-backed mandrel has a high frequency mechanical resonance. Each hydrophone is connected in a chain by a plurality of interconnects having a substantially lower sensitivity than each hydrophone.

19 Claims, 2 Drawing Sheets

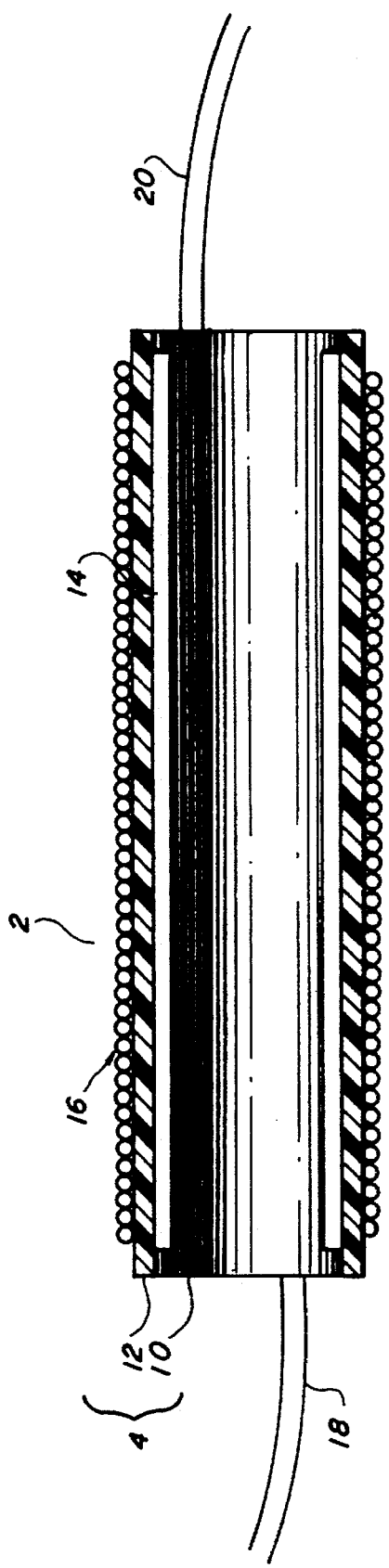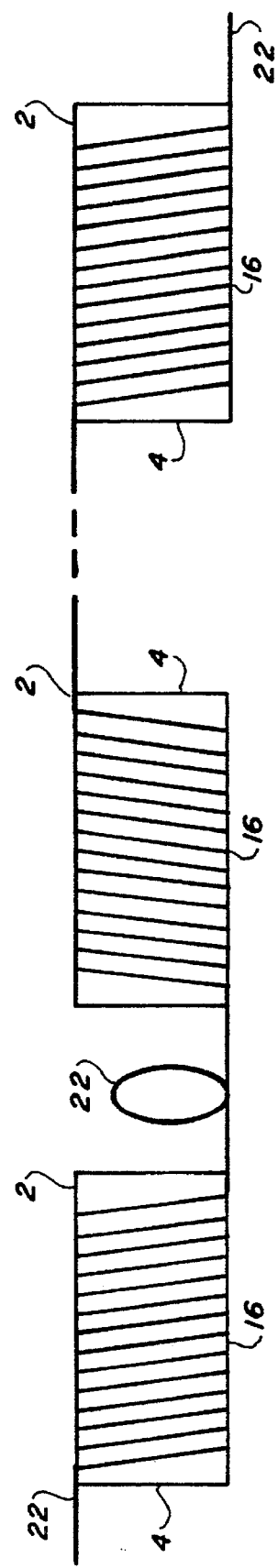

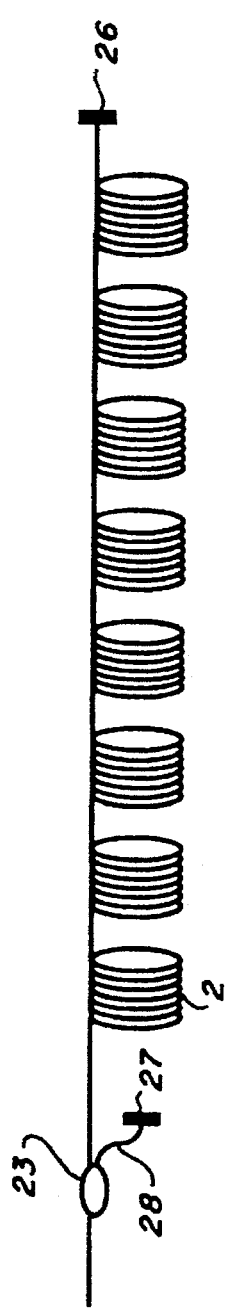
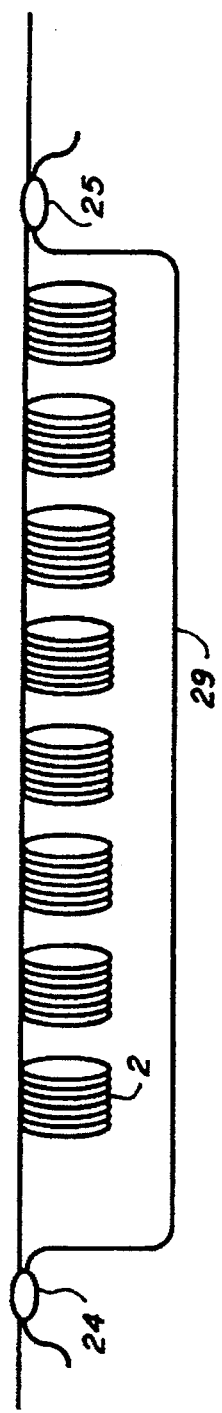
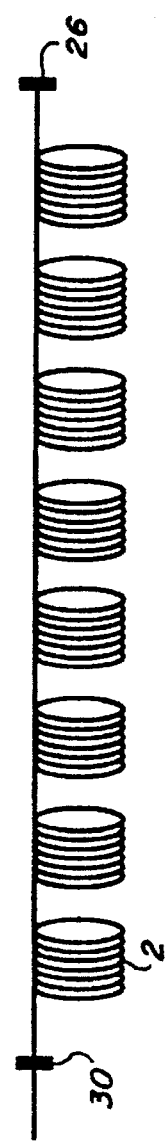
FIG. 3a
FIG. 3b
FIG. 3c

HYDROPHONE GROUP DESIGN FOR SHALLOW TOWED APPLICATIONS

BACKGROUND OF THE INVENTION

1. Field of the Invention

The present invention relates to a hydrophone group designed for use in shallow towed applications and particularly to a new mandrel for use in a hydrophone group designed for shallow towed applications.

2. Description of the Related Art

In general, a hydrophone is an acoustic pressure sensor designed for underwater use. A hydrophone detects acoustic wave signals under water. A hydrophone group generally comprises a plurality of hydrophone sensors, also called simply "hydrophones", towed behind a ship. In a hydrophone group, an optical source and photodetector are typically located on a towing vessel and connected through one or more optical fibers to a trailing network of hydrophones. One beam of coherent light is passed through one fiber in the hydrophones and subjected to underwater acoustic pressure, while another beam of coherent light is passed through a reference fiber not subjected to the underwater acoustic pressure and acts as a reference signal. The beams are brought to interference after transmission through an optical coupler, or the like. The optical fibers in the hydrophone groups undergo variations in refractive index and geometrical shape in response to local pressures under the water, i.e., in response to soundwaves. These variations cause phase modulation of the light beam passing through the hydrophone sensors. Soundwaves in the water are detected based upon the output signal. A hydrophone group requires a single interferometer. A typical hydrophone system uses a plurality of interferometers.

Towed hydrophone systems are typically used for geophysical exploration in which echo returns from active signals probing the ocean bottom are measured. Such arrays are towed in water depths of up to 50 feet and operate at acoustic frequencies of less than 100 Hz. The low frequencies allow an extended design of the individual hydrophones for flow noise averaging. In general, flow noise averaging is performed by summing the output signal of a hydrophone with the output signals of the other hydrophones in the group. Thus, a large number of hydrophones provide a good signal to noise ratio thereby helping eliminate the incoherent flow noise of the hydrophone system.

For shallow towed applications, a highly sensitive hydrophone system is useable. Previously, however, the sensitivity of the connection between adjacent individual hydrophones relative to the sensitivity of the individual hydrophone was a limiting factor in obtaining a high sensitivity by simply connecting several mandrels together. Specifically, the fiber extending between adjacent hydrophones, termed the interconnect, should be insensitive, providing a low responsivity to array bending and flexing.

The present invention sets forth a hydrophone group design which provides flow noise averaging and high sensitivity. Each hydrophone has a high sensitivity allowing discrimination against noise produced in the interconnects.

SUMMARY OF THE INVENTION

Accordingly, it is an object of the present invention to provide a highly responsive mandrel suitable for use in a hydrophone group designed for shallow towed applications.

It is another object of the present invention to provide a mandrel for use in a highly sensitive hydrophone.

It is yet a further object of the present invention to provide a hydrophone group designed for shallow towed applications having highly sensitive hydrophones.

It is another object of the present invention to provide a hydrophone group wherein each hydrophone of the group is significantly more acoustically sensitive than the interconnects between the hydrophones.

Additional objects and advantages of the invention will be set forth in part in the description in which follows and in part will be obvious from the description, or may be learned by practice of the invention.

Objects of the present invention are achieved in a mandrel for a hydrophone comprising an extended solid frame substantially non-compliant along a longitudinal axis, the extended solid frame provided with a channel around the periphery of the extended solid frame, the channel extending substantially the entire length of the extended solid frame, a flexible outer covering surrounding the extended solid frame such that the channel forms an air gap with said flexible outer covering, the flexible outer covering being highly compliant in a radial direction extending from the longitudinal axis, and the mandrel having a high frequency mechanical resonance.

Objects of the present invention are achieved in a mandrel for a hydrophone comprising an extended frame having a semi-filled center substantially non-compliant along a longitudinal axis, the extended frame provided with a channel around the periphery of the extended frame, the channel extending substantially the entire length of the extended frame, a flexible outer covering surrounding the extended frame such that the channel forms an air gap with said flexible outer covering, the flexible outer covering being highly compliant in a radial direction extending from the longitudinal axis, and the mandrel having a high frequency mechanical resonance.

Objects of the present invention are achieved in a hydrophone group comprising a plurality of mandrels, each mandrel including an extended solid frame substantially non-compliant along a longitudinal axis, the extended solid frame provided with a channel around the periphery of the extended solid frame, the channel extending substantially the entire length of the extended solid frame, a flexible outer covering surrounding the extended solid frame such that the channel forms an air gap with said flexible outer covering, the flexible outer covering being highly compliant in a radial direction extending from the longitudinal axis, and the air-backed mandrel having only a high frequency mechanical resonance a plurality of interconnects connecting the plurality of mandrels.

BRIEF DESCRIPTION OF THE DRAWINGS

These and other objects and advantages of the invention will become apparent and more readily appreciated from the following description Of the preferred embodiments, taken in conjunction with the accompanying drawings of which:

FIG. 1 is a cross-sectional view of an air-backed mandrel in accordance with the preferred embodiment of the present invention.

FIG. 2 is a diagram of a hydrophone group design in accordance with the preferred embodiment of the present invention.

FIG. 3a is a diagram of a hydrophone group design in accordance with the preferred embodiment of the present invention having a Michelson Interferometer configuration.

FIG. 3b is a diagram of a hydrophone group design in accordance with the preferred embodiment of the present invention having a Mach Zehnder Interferometer configuration.

FIG. 3c is a diagram of a hydrophone group design in accordance with the preferred embodiment of the present invention having a Fabry-Perot Interferometer configuration.

DETAILED DESCRIPTION OF THE INVENTION

FIG. 1 is a cross-sectional view of a hydrophone 2 in accordance with a preferred embodiment of the present invention. An air-backed mandrel 4 generally comprises an extended solid frame 10 having a channel 14 around the circumference thereof. A flexible outer covering 12 longitudinally surrounds the solid frame 10. The channel 14 forms an air gap between the flexible outer covering 12 and the solid frame 10 creating an air backing.

A sensing fiber 16 is wrapped around the air-backed mandrel 4. An input fiber 18 extends from the prior mandrel or light source, while the output fiber 20 leads to a subsequent mandrel.

The input fiber 18 and the output fiber 20 form a part of the hydrophone 2. To prevent pickup from acoustic or vibrational coupling in the input fiber 18 and the output fiber 20 from becoming the dominant signal measured by the hydrophone 2, each hydrophone 2 of the group must be made to be more acoustically sensitive than the input fiber 18 and the output fiber 20. The input fiber 18 and the output fiber 20 are typically plastic coated and have a normalized responsivity of −328 dB re 1/µPa or less. Assuming 20 meters of interconnect between the hydrophones 2, the responsivity of the input fiber 18 or the output fiber 20 is approximately −165 dB re rad/µPa.

The preferred length of each air-backed mandrel 4 is 12.7 cm and the preferred diameter of each air-backed mandrel 4 is 2.54 cm. Thus, the total amount of optical sensing fiber 16 wrapped in a single layer of a hydrophone group, composed of eight hydrophones 2, is 288 meters. In accordance with the preferred embodiment, the preferred normalized responsivity of the hydrophone 2 is −295 dB re 1/µPa. Thus, with a hydrophone group composed of eight hydrophones 2, the hydrophone group has a responsivity of −109 dB re rad/µPa. This is sufficient to ensure that the signals measured by the hydrophone group are not coupling into the interconnect leads, i.e., the input fiber 18 and the output fiber 20.

The solid frame 10 of the air-backed mandrel 4 may be provided with either a partially filled center (to minimize hose blocking in the array) or a solid center. Preferably, the solid frame 10 is constructed of metal and is very stiff along the longitudinal axis, i.e., there is minimal flexing along the length of the air-backed mandrel 4. The flexible outer covering 12 is preferably made of plastic which is glued, for example, with epoxy, to the solid frame 10. The air-backed mandrel 4 preferably has a very high resonance frequency, while the flexible outer covering 12 is very responsive radially. However, the flexibility of the flexible outer covering 12 should not be such that it grounds against the surface of the solid frame 10. In accordance with the preferred embodiment of the present invention, any low frequency mechanical resonances are eliminated due to the metal structure of the solid frame 10 and the flexibility of the flexible outer covering 12.

FIG. 2 is a diagram of a hydrophone group designed in accordance with the preferred embodiment of the present invention. A series of hydrophones 2 are sequentially interconnected via interconnects 22. The interconnects 22 generally comprise the output fiber 20 of a first hydrophones 2 and the input fiber 18 of a subsequent hydrophone 2. Preferably, the hydrophone group is composed of 8 or 16 hydrophones 2 which are configured into a single interferometer. At most, two of the air-backed mandrels 4 in each hydrophone group will have optical fiber couplers placed inside of them to form the sensing interferometer. The remaining air-backed mandrels 4 will only have optical sensing fibers 16 wrapped around the flexible outer covering 12.

The sensitivity of the hydrophone group is related to the length of the fiber on any given air-backed mandrel 4. The phase shifts in the air-backed mandrel 4 should be larger than the phase shifts in the interconnects 22. The sensitivity of a hydrophone depends on the amount of fiber and on the responsivity of the flexible outer covering 12. Responsivity can be increased by having multiple layers of sensing fiber 16 wrapped around the flexible outer covering 12, however, too many layers can reduce the compliance of the air-backed mandrel 4, which reduces the overall normalized responsivity of the hydrophone 2. Additionally, depending upon the application for which the hydrophone group is be used, the amount of wrapping can be varied over the length of the air-backed mandrel 4 to produce for example, a shaded hydrophone or a graded hydrophone. Additionally, the responsivity of the overall hydrophone group can be varied by changing the lengths of the interconnects 22.

The hydrophone group set forth in FIG. 2 form a single interferometer, which is typically put into a hose filled with foam, so as to maintain the spacing between the individual air-backed mandrels 4. This also reduces the relative motion between the air-backed mandrels 4, thereby further decreasing the phase shifts in the interconnects 22.

FIG. 3a is a diagram of a hydrophone group designed in accordance with the preferred embodiment of the present invention having a Michelson interferometer configuration. In this configuration, an optical coupler 23 splits a light beam such that one beam travels through each of the hydrophones 2 and is reflected by the mirror 26 to return through each of the hydrophones 2 to the optical coupler 23. The other beam travels down a length of reference fiber 28 and is reflected by the mirror 27 back to the optical coupler 23. The optical coupler 23 recombines the two beams into a single beam which is then analyzed to detect soundwaves.

FIG. 3b is a diagram of a hydrophone group design in accordance with the preferred embodiment of the present invention having a Mach Zehnder interferometer configuration. In a Mach Zehnder interferometer configuration, a beam of light is split by an optical coupler 24 such that one beam travels down a reference fiber 29 and the other beam travels through the chain of hydrophones 2. An optical coupler 25 at the other end of the hydrophone group recombines the two beams which are then analyzed to detect soundwaves. The Mach Zehnder interferometer configuration is currently the most common configuration used. The light beam only travels once through the hydrophone group, and as such the hydrophone group is less responsive than the Michelson interferometer design, however, less noise is produced as there is no interference between the forward travelling and backward travelling beam.

FIG. 3c is a diagram of hydrophone group design in accordance with the preferred embodiment of the present invention having a Fabry-Perot interferometer configuration. In accordance with the Fabry-Perot interferometer configuration, a partially reflective mirror 30 reflects a portion of a beam backwards while allowing another portion of the beam to proceed through the hydrophone group. At the other end of the hydrophone group a mirror 26 reflects the beam back through the hydrophone group and through the partially reflective mirror 30 where it combines with the remainder of the beam which was reflected by the partially reflective mirror 30. Preferably, the reflectivity of the mirror 26 is low, so as to reduce the intensity of cross-talk. The Fabry-Perot interferometer design minimizes the number of fibers required, and as the light passes through the hydrophone group twice, provides high responsivity. However, the partially reflective mirror 30 is currently extensive and often difficult to obtain.

Although a few configurations of the preferred embodiment of the present invention have been shown and described, it would be appreciated to those skilled in the art that changes may be made in the embodiment without departing from the principles and spirit of the invention, the scope of which is defined in the claims and their equivalents.

In accordance with the preferred embodiment of the present invention, a hydrophone 2 is provided with an air-backed mandrel 4 sufficiently sensitive such that interconnects 22 between adjacent hydrophones 2 do not introduce excessive noise. For shallow towed applications, this is achieved by using an air-backed mandrel 4 having a rigid solid frame 10 and a flexible outer covering 12. The increased sensitivity of the air-backed mandrel 4, in accordance with the present invention, allows the incorporation of the hydrophone 4 into a multitude of hydrophone group configurations and allows a variety of cheap and easy to obtain interconnects 22 to be utilized.

What is claimed is:

1. A mandrel for a hydrophone comprising:

an extended solid frame substantially non-compliant along a longitudinal axis, said extended solid frame provided with a channel around the periphery of said extended solid frame, said channel extending substantially the entire length of said extended solid frame; and a flexible outer covering surrounding said extended solid frame such that said channel forms an air gap with said flexible outer covering, said flexible outer covering being compliant in a radial direction extending from the longitudinal axis.

2. The mandrel of claim 1 wherein:

said extended solid frame is formed of metal.

3. The mandrel of claim 1 wherein:

said flexible outer covering is formed of plastic.

4. The mandrel of claim 1 wherein:

said extended solid frame is formed of metal; and said flexible outer covering is formed of plastic.

5. The mandrel of claim 1 wherein:

said mandrel has a normalized responsivity of about −295 dB re 1/μPa.

6. The mandrel of claim 1 further comprising:

a sensing fiber wrapped around said flexible outer covering.

7. A mandrel for a hydrophone comprising:

an extended frame having a semi-filled center substantially non-compliant along a longitudinal axis, said extended frame provided With a channel around the periphery of said extended frame, said channel extending substantially the entire length of said extended frame; and a flexible outer covering surrounding said extended frame such that said channel forms an air gap with said flexible outer covering, said flexible outer covering being compliant in a radial direction extending from the longitudinal axis.

8. The mandrel of claim 7 wherein:

said extended frame is formed of metal.

9. The mandrel of claim 7 wherein:

said flexible outer covering is formed of plastic.

10. The mandrel of claim 7 wherein:

said extended frame is formed of metal; and said flexible outer covering is formed of plastic.

11. A mandrel of claim 7 wherein:

said mandrel has a normalized responsivity of about −295 dB re 1/μPa.

12. A hydrophone group for shallow towed applications in water depths up to 50 feet comprising:

a plurality of mandrels, each mandrel including:

an extended solid frame substantially non-compliant along a longitudinal axis, said extended solid frame provided with a channel around the periphery of said extended solid frame, said channel extending substantially the entire length of said extended solid frame;

a flexible outer covering surrounding said extended solid frame such that said channel forms an air gap with said flexible outer covering, said flexible outer covering being compliant in a radial direction extending from the longitudinal axis;

a sensing fiber wrapped around said flexible outer covering; and a plurality of interconnects respectively connecting adjacent pairs of said plurality of mandrels.

13. The hydrophone group of claim 12 further comprising:

a reference fiber.

14. The hydrophone group of claim 13 wherein:

said hydrophone group forms a Michelson Interferometer.

15. The hydrophone group of claim 13 wherein:

said hydrophone group forms a Mach Zehnder Interferometer.

16. The hydrophone group of claim 13 wherein:

said hydrophone group forms a Fabry-Perot Interferometer.

17. The hydrophone group of claim 12 wherein:

said hydrophone group is towed in less than 50 feet of water.

18. The hydrophone group of claim 12 wherein:

said air-backed mandrel has a normalized responsivity of at least −295 dB re 1/μPa.

19. The hydrophone group of claim 18 wherein:

each of said plurality of interconnects has a normalized responsivity of at most −328 dB re 1/μPa.

* * * * *